Oct. 15, 1929.  F. ERWIN  1,731,407
COMBINED SUPPORT FOR LIGHTS AND BAGGAGE CARRIERS
Filed April 22, 1927
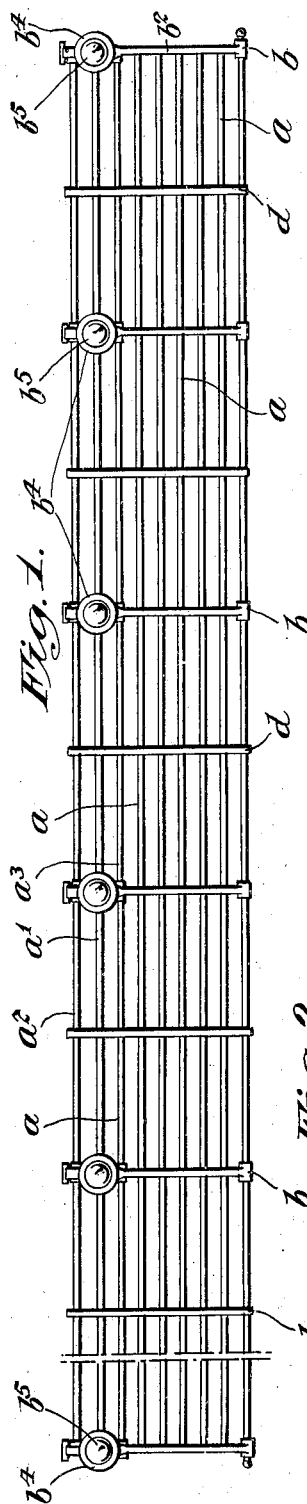
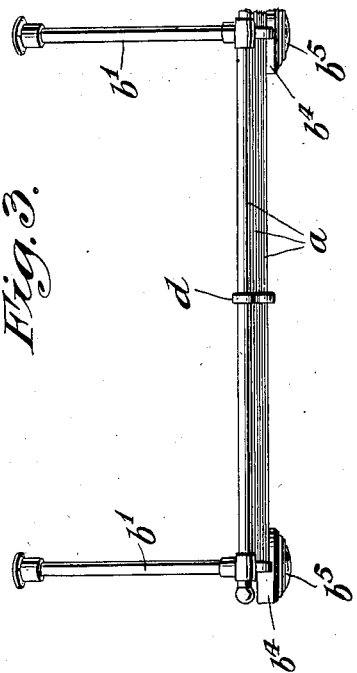
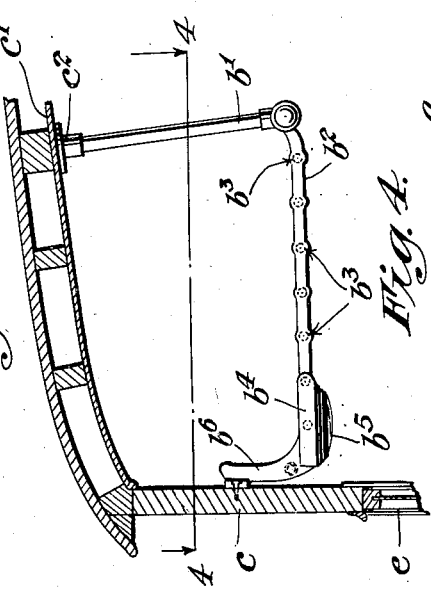
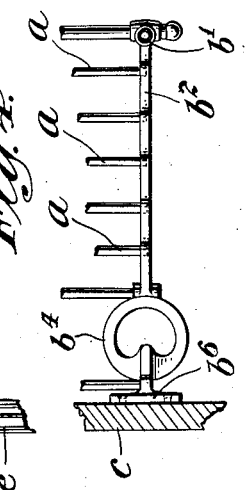
INVENTOR
Fred Erwin
BY
Redding, Greeley, O'Shea & Campbell
his ATTORNEYS Patented Oct. 15, 1929

1,731,407

UNITED STATES PATENT OFFICE

FRED ERWIN, OF ALLENTOWN, PENNSYLVANIA, ASSIGNOR TO INTERNATIONAL MOTOR COMPANY, OF NEW YORK, N. Y., A CORPORATION OF DELAWARE

COMBINED SUPPORT FOR LIGHTS AND BAGGAGE CARRIERS

Application filed April 22, 1927. Serial No. 185,789.

This invention pertains to baggage carriers and contemplates the provision of a baggage carrier for the interior of motor vehicle buses, railway carriages, and similar vehicles. The baggage carrier according to the present invention consists of a rack made up of a series of rods supported upon brackets hung from the roof and side walls of the vehicle. It is an object of this invention to form the brackets supporting the rods with light sockets so that the interior of the vehicle to which the rack is applied may be lighted in this way, thus doing away with the expense and necessity of providing separate lighting fixtures. The particular type of bracket used may vary but a type which is thought to be novel and to present many advantages is shown in the drawings illustrating a preferred embodiment of the invention and in which:

Figure 1 is a bottom plan view of a rack according to the invention;

Figure 2 is a vertical sectional view showing the rack in place in a vehicle body.

Figure 3 is a front elevation of the rack; and

Figure 4 is top plan detailed view taken in a plane indicated by the line 4—4 in Figure 2 and looking in the direction of the arrows.

The rods $a$, which form the support for the carrying of baggage, pass through holes $b^3$ formed in the horizontal arm $b^2$ of the bracket. The horizontal arm $b^2$ of the bracket has formed integrally therewith a cylindrical receptacle $b^4$ for an electric lamp or the like, the bottom of the receptacle being formed to receive a glass $b^5$. Also formed integrally with the horizontal arm $b^2$ is the arm $b^6$ by means of which the bracket is fastened to the side wall $c$ of a vehicle. The other end of the horizontal arm $b^2$ is formed with an upwardly extending arm $b'$ by means of which the bracket is affixed to the roof $c'$ of the vehicle, as at $c^2$. A series of brackets $b$ are so affixed to the roof and side walls of the vehicle as to afford adequate support for the length of the rods $a$. Braces $d$ may be disposed between the brackets $b$ through which braces the rods $a$ also pass in order to reinforce the structure.

The carrier, comprising the rods and brackets as described, may run the entire length of the interior of the vehicle and may be disposed as shown in Figure 2, slightly above the windows $e$. The lamp within the receptacle $b^4$ may be supplied with energy through wires which may be run through the rods $a'$, $a^2$, or $a^3$, in any desirable manner, as will be obvious.

Thus there has been provided a baggage carrier for the interior of vehicles such as motor buses and the like which is suspended from the roof and side walls of the vehicle by supporting means which are formed integrally with lighting means for the interior of the vehicle.

No limitation upon the scope of the invention is intended except as indicated in the following claim.

What I claim is:

In combination with the wall of a passenger vehicle having windows, a bracket having a vertical arm fastened to the wall out of the window area and an approximately horizontal arm adapted to support an overhead baggage rack, an electric lamp socket, and means formed integrally on the under side of the horizontal arm to receive and mount the socket and lamp with downwardly projecting rays.

This specification signed this 18th day of April A. D. 1927.

FRED ERWIN.